(12) United States Patent
Meyerhoff et al.

(10) Patent No.: US 7,283,962 B2
(45) Date of Patent: Oct. 16, 2007

(54) METHODS AND SYSTEMS FOR DETECTING, MEASURING, AND MONITORING STRESS IN SPEECH

(75) Inventors: James L. Meyerhoff, Silver Spring, MD (US); John H. L. Hansen, Louisville, CO (US)

(73) Assignee: United States of America as Represented by the Secretary of the Army, Washington, DC (US)

( * ) Notice: Subject to any disclaimer, the term of this patent is extended or adjusted under 35 U.S.C. 154(b) by 860 days.

(21) Appl. No.: 10/392,881

(22) Filed: Mar. 21, 2003

(65) Prior Publication Data

US 2007/0213981 A1 Sep. 13, 2007

Related U.S. Application Data

(60) Provisional application No. 60/368,806, filed on Mar. 21, 2002.

(51) Int. Cl.
*G10L 21/00* (2006.01)
(52) U.S. Cl. ............... 704/270; 704/275; 704/251
(58) Field of Classification Search ........ 704/270, 704/275, 251
See application file for complete search history.

(56) References Cited

U.S. PATENT DOCUMENTS

| | | | | |
|---|---|---|---|---|
| 5,367,454 A | * | 11/1994 | Kawamoto et al. ......... 715/706 |
| 5,539,860 A | * | 7/1996 | DeSimone et al. ......... 704/234 |
| 5,647,834 A | * | 7/1997 | Ron ............................ 600/23 |
| 5,987,415 A | * | 11/1999 | Breese et al. ............... 704/270 |
| 6,006,188 A | * | 12/1999 | Bogdashevsky et al. .... 704/270 |
| 6,151,571 A | * | 11/2000 | Pertrushin .................... 704/209 |
| 6,173,260 B1 | * | 1/2001 | Slaney ....................... 704/250 |
| 6,463,415 B2 | * | 10/2002 | St. John ..................... 704/273 |
| 2003/0033145 A1 | * | 2/2003 | Petrushin .................... 704/236 |
| 2003/0078768 A1 | * | 4/2003 | Silverman et al. .......... 704/206 |

* cited by examiner

*Primary Examiner*—Vijay Chawan
(74) *Attorney, Agent, or Firm*—Elizabeth Arwine

(57) ABSTRACT

As disclosed herein, the present invention provides methods and systems for detecting, measuring, or monitoring the presence of absence of at least one emotion in a subject from a speech sample obtained from the subject. In particular, the methods and systems of the present invention comprise extracting at least one feature from the speech sample, assigning the speech sample a score using a weighted frequency band scoring scheme, and comparing the score with a general reference model or a control. As disclosed, the methods, systems and computer programs of the present invention provide detection error rates of about 4.7% or less, preferably about 3.0% or less, more preferably about 2.0% or less, most preferably about 1.0% or less and thereby reduced the detection error rate by about 60.0% or more, preferably about 70.0% or more, more preferably about 80.0% or more, even more preferably about 90% or more, and most preferably 95.0% or more than the detection error rates of prior art methods.

39 Claims, 4 Drawing Sheets

| Test Time | Feature Mean | ΔHMM Score |
|---|---|---|
| A: T−7day | 6.2 | 2.0 |
| B: T−2day | 6.3 | 2.7 |
| C: T−1hr | 6.5 | 5.3 |
| D: T | 6.0 | 0.8 |
| E: T−1hr | 7.1 | 7.4 |
| F: T+2day | 6.9 | 6.8 |
| G: T+7day | 7.3 | 4.7 |

METHODS AND SYSTEMS FOR DETECTING, MEASURING, AND MONITORING STRESS IN SPEECH

CROSS REFERENCE TO RELATED APPLICATIONS

This application claims the benefit of U.S. Patent Application Ser. No. 60/368,806, filed 21 Mar. 2002, which names James L. Meyerhoff and John H. L. Hansen as joint inventors and is herein incorporated by reference in its entirety.

ACKNOWLEDGMENT OF GOVERNMENT SUPPORT

This invention was made by employees of the United States Army and the University of Colorado Boulder. The government has rights in the invention.

BACKGROUND OF THE INVENTION

1. Field of the Invention

The present invention relates to methods and systems for detecting and measuring stress in speech.

2. Description of the Related Art

While presently-available automatic speech recognition (ASR) technology may be adequate for some commercial use, military, emergency medical and psychiatric applications are limited by lack of capacity to adjust for changes in the voice spectrum induced by ambient noise, multiple speakers or emotion-driven or task-induced psychological stress in the speaker. In harsh military scenarios where voice interaction with computers is needed for command and control, task workload and emotional stress has been shown to significantly impact military speech technology. See Hansen, J. H. L. et al. (2000) NATO Research & Technology Organization RTO-TR-10, AC/323(IST)TP/5 IST/TG-01. The events of 11 Sep. 2001 have dramatically shown the need for methods and systems that utilize voice data and information to account for stress and emotion in speech in order to effectively and accurately coordinate the deployment of civilian and military first-responders. Additionally, there is an increasing need to detect, measure, or account for stress and other emotions in speech during voice communications in order to detect deception or emotions such as stress or anxiety in civilian and military situations such as law enforcement interrogations.

Studies have shown that the performance of speech recognition algorithms severely degrade due to the presence of task and emotional induced stress in adverse conditions. Published studies have suggested that psychological stress causes an increase in the fundamental frequency ($F_o$) of the voice, as well as a decrease in the FM component of $F_o$. See Brenner, M., et al. (1979) Psychophysiology 16(4):351-357; Brenner, M., et al. (1994) Aviation, Space and Environmental Medicine 65:21-26; VanDercar, D. H., et al. (1980) Journal of Forensic Sciences 25:174-188; and Williams, C. and Stevens, K. (1972) J. Acoustical Soc. Amer. 52(4):1238-1250. Prior art methods for detecting stress in speech are based on pitch structure, duration, intensity, glottal characteristics, and vocal tract spectral structure using detection or classification methods based on Hidden Markov Models (HMM) or Bayesian Hypothesis testing. See Zhou, G. et al. (2001) IEEE Trans. Speech & Audio Process 9(3):201-216; Hansen, J. H. L. et al. (1996) IEEE Trans. Speech Audio Process., 4(4):307-313, 1996; and Caims, D. A. et al. (1994) J. Acoust. Soc. Am., 96(6):3392-3400.

Detecting stress in speech using the prior art methods, however, has been problematic and unreliable. See Cestaro, V., et al. (1998) Society for Psychophysiological Research, Annual Meeting. Specifically, reliable detection of stress, even in clean speech, is challenging as reliable detection requires that a speaker change the neutral speech production process in a consistent manner so that given features extracted can be used to detect and perhaps quantify the change in the speech production process. Unfortunately, speakers are not always consistent in how they convey stress or emotion in speech.

Recently, a new feature based on the Teager Energy Operator (TEO), TEO-CB-AutoEnv, was proposed and found to be more responsive to speech under stress. See Zhou, G. et al. (2001) IEEE Trans. Speech & Audio Process 9(3):201-216. However, use of the TEO-CB-AutoEnv feature with an HMM trained stressed speech classifier still provides high error rates of 22.5% and 13% for some types of stress and neutral speech detection, respectively. Additionally, the failure of published and commercially-available methods and systems to consistently measure psychological stress may be due to a lack of access to a robust, yet ethical human stress model as well as a failure to utilize validated stress markers.

Therefore, a need still exists for methods and systems for detecting and measuring stress in speech as well as human stress models for detecting and measuring stress in speech.

SUMMARY OF THE INVENTION

The present invention provides methods and systems for detecting, measuring, or monitoring the presence of absence of at least one emotion in a subject from a speech sample obtained from the subject.

In some embodiments, the present invention provides a method for detecting, measuring, or monitoring the presence or absence of at least one emotion from a speech sample obtained from a subject which comprises extracting at least one feature from the speech sample, assigning the speech sample a score using a weighted frequency band scoring scheme, and comparing the score with a general reference model or a control.

The emotion can be admiration, affection, agitation, anger, apprehension, betrayal, consternation, contempt, curiosity, deceitfulness, determination, desire, disappointment, disgust, dread, ecstasy, enthusiasm, embarrassment, fanaticism, fear, ferment, hate, hope, indignation, impatient, inspiration, joy, passion, perturbation, sadness, sincerity, shame, shock, sorrow, stress, sufferance, suspicion, sympathy, thrill, tolerance, regret, vehemence, or zeal. In preferred embodiments, the emotion is stress. In some embodiments, the emotion is induced by an external influence.

In some embodiments, the speech sample is "o" in the word "no". In some embodiments, the word "no" is in the phrase "the answer to the question is no".

In some embodiments, the feature extracted is at least one critical frequency band. In preferred embodiments, the critical frequency band is a narrow bandwidth of about 100 Hz to about 400 Hz. In some embodiments, the critical frequency bands are defined by partitioning the audible frequency range of the speech sample into fifteen equal bandwidths. In some embodiments, the critical frequency band is frequency band 5, 8, 9, or 13. In some embodiments, the critical frequency band is frequency band 7, 12, 14, or 16.

In some embodiments, the feature is sensitive to neutral speech. In some embodiments, frequency band 5, 8, 9, or 13 is sensitive to neutral speech. In some embodiments, the feature is sensitive to stress in speech. In some embodiments, frequency band 7, 12, 14, or 16 is sensitive to stress in speech.

In preferred embodiments, assigning the speech sample the score using the weighted frequency band scoring scheme comprises assigning the feature a weight based on whether the feature is sensitive to neutral speech or emotion in speech, wherein all weights sum to unity.

In some preferred embodiments, at least one feature sensitive to neutral speech and at least one feature sensitive to emotion in speech are extracted and the score is the sum of the weighted features sensitive to neutral speech minus the sum of the weighted features sensitive to emotion in speech. A positive score indicates the absence of the emotion. A negative score indicates the presence of the emotion.

In preferred embodiments, a plurality of features are extracted from the speech sample. The plurality of features extracted may be a plurality of vowels in the speech sample, a plurality of consonants in the speech sample, or both.

The present invention also provides a method for detecting, measuring, or monitoring the presence or absence of an emotion in a subject from a speech sample obtained from the subject which comprises parameterizing training speech data from at least one speaker obtained while the speaker was experiencing the emotion and while the speaker was lacking the emotion; extracting an TEO-CB-AutoEnv feature on a frame-by-frame basis over at least one voiced speech section; obtaining TEO-CB-AutoEnv area coefficient data from at least one filter band on a frame by-frame basis; submitting the TEO-CB-AutoEnv area coefficient data to at least one hidden Markov model (HMM) based training scheme using traditional forward-backward Baum-Welch re-estimation; classifying each band as sensitive to the presence of the emotion or sensitive to the absence of the emotion; and assigning the speech sample a score using a weighted frequency band scoring scheme, wherein the score indicates the presence or absence of the emotion.

In preferred embodiments, the TEO-CB-AutoEnv area coefficient data is obtained by using a frame of speech data, filtering the frame of speech data across at least one critical-band frequency partition, applying the Teager Energy Operator (TEO) at the output of the filter band, analyzing each processed block to obtain an autocorrelation envelope over about a 0 to about a 25 msec lag range, and determining the area under the autocorrelation envelope for the band. A large area under the autocorrelation envelope indicates the absence of the emotion and a small area under the autocorrelation envelope indicates the presence of the emotion. The speaker may be the same as the subject or different. The training speech data may be obtained from a plurality of speakers.

The emotion can be admiration, affection, agitation, anger, apprehension, betrayal, consternation, contempt, curiosity, deceitfulness, determination, desire, disappointment, disgust, dread, ecstasy, enthusiasm, embarrassment, fanaticism, fear, ferment, hate, hope, indignation, impatient, inspiration, joy, passion, perturbation, sadness, sincerity, shame, shock, sorrow, stress, sufferance, suspicion, sympathy, thrill, tolerance, regret, vehemence, or zeal. In preferred embodiments, the emotion is stress. In some embodiments, the emotion is induced by an external influence.

In some embodiments, the speech sample is "o" in the word "no". In some embodiments, the word "no" is in the phrase "the answer to the question is no". In preferred embodiments, a plurality of features are extracted from the speech sample. The plurality of features extracted may be a plurality of vowels in the speech sample, a plurality of consonants in the speech sample, or both.

In some embodiments, the present invention provides a system for detecting, measuring, or monitoring the presence or absence of an emotion in a subject from a speech sample obtained from the subject which comprises a feature extractor that extracts at least one feature from the speech sample, a scorer that assigns the speech sample a score using a weighted frequency band scoring scheme, and a determinator that determines the presence or absence of the emotion based on the score. In some embodiments, the system is a computer system, a telephone system, or a voice recognition system.

The emotion can be admiration, affection, agitation, anger, apprehension, betrayal, consternation, contempt, curiosity, deceitfulness, determination, desire, disappointment, disgust, dread, ecstasy, enthusiasm, embarrassment, fanaticism, fear, ferment, hate, hope, indignation, impatient, inspiration, joy, passion, perturbation, sadness, sincerity, shame, shock, sorrow, stress, sufferance, suspicion, sympathy, thrill, tolerance, regret, vehemence, or zeal. In preferred embodiments, the emotion is stress. In some embodiments, the emotion is induced by an external influence.

In some embodiments, the speech sample is "o" in the word "no". In some embodiments, the word "no" is in the phrase "the answer to the question is no".

In some embodiments, the feature extracted is at least one critical frequency band. In preferred embodiments, the critical frequency band is a narrow bandwidth of about 100 Hz to about 400 Hz. In some embodiments, the critical frequency bands are defined by partitioning the audible frequency range of the speech sample into fifteen equal bandwidths. In some embodiments, the critical frequency band is frequency band 5, 8, 9, or 13. In some embodiments, the critical frequency band is frequency band 7, 12, 14, or 16.

In some embodiments, the feature is sensitive to neutral speech. In some embodiments, frequency band 5, 8, 9, or 13 is sensitive to neutral speech. In some embodiments, the feature is sensitive to stress in speech. In some embodiments, frequency band 7, 12, 14, or 16 is sensitive to stress in speech.

In preferred embodiments, assigning the speech sample the score using the weighted frequency band scoring scheme comprises assigning the feature a weight based on whether the feature is sensitive to neutral speech or emotion in speech, wherein all weights sum to unity.

In some preferred embodiments, at least one feature sensitive to neutral speech and at least one feature sensitive to emotion in speech are extracted and the score is the sum of the weighted features sensitive to neutral speech minus the sum of the weighted features sensitive to emotion in speech. A positive score indicates the absence of the emotion. A negative score indicates the presence of the emotion.

In preferred embodiments, a plurality of features are extracted from the speech sample. The plurality of features extracted may be a plurality of vowels in the speech sample, a plurality of consonants in the speech sample, or both.

In some embodiments, the present invention provides a computer program embodied on a computer readable medium for analyzing the presence or absence of an emotion in a subject from a speech sample obtained from the subject which comprises a code segment that extracts at least one feature from the speech sample, a code segment that assigns the speech sample a score using a weighted frequency band scoring scheme, and a code segment that determines the presence or absence of the emotion based on the score.

The emotion can be admiration, affection, agitation, anger, apprehension, betrayal, consternation, contempt, curiosity, deceitfulness, determination, desire, disappointment, disgust, dread, ecstasy, enthusiasm, embarrassment, fanaticism, fear, ferment, hate, hope, indignation, impatient, inspiration, joy, passion, perturbation, sadness, sincerity, shame, shock, sorrow, stress, sufferance, suspicion, sympathy, thrill, tolerance, regret, vehemence, or zeal. In preferred embodiments, the emotion is stress. In some embodiments, the emotion is induced by an external influence.

In some embodiments, the speech sample is "o" in the word "no". In some embodiments, the word "no" is in the phrase "the answer to the question is no".

In some embodiments, the feature extracted is at least one critical frequency band. In preferred embodiments, the critical frequency band is a narrow bandwidth of about 100 Hz to about 400 Hz. In some embodiments, the critical frequency bands are defined by partitioning the audible frequency range of the speech sample into fifteen equal bandwidths. In some embodiments, the critical frequency band is frequency band 5, 8, 9, or 13. In some embodiments, the critical frequency band is frequency band 7, 12, 14, or 16.

In some embodiments, the feature is sensitive to neutral speech. In some embodiments, frequency band 5, 8, 9, or 13 is sensitive to neutral speech. In some embodiments, the feature is sensitive to stress in speech. In some embodiments, frequency band 7, 12, 14, or 16 is sensitive to stress in speech.

In preferred embodiments, assigning the speech sample the score using the weighted frequency band scoring scheme comprises assigning the feature a weight based on whether the feature is sensitive to neutral speech or emotion in speech, wherein all weights sum to unity.

In some preferred embodiments, at least one feature sensitive to neutral speech and at least one feature sensitive to emotion in speech are extracted and the score is the sum of the weighted features sensitive to neutral speech minus the sum of the weighted features sensitive to emotion in speech. A positive score indicates the absence of the emotion. A negative score indicates the presence of the emotion.

In preferred embodiments, a plurality of features are extracted from the speech sample. The plurality of features extracted may be a plurality of vowels in the speech sample, a plurality of consonants in the speech sample, or both.

The methods, systems and computer programs of the present invention provide detection error rates of about 4.7% or less, preferably about 3.0% or less, more preferably about 2.0% or less, most preferably about 1.0% or less and thereby reduced the detection error rate by about 60.0% or more, preferably about 70.0% or more, more preferably about 80.0% or more, even more preferably about 90% or more, and most preferably 95.0% or more than the detection error rates of prior art methods.

It is to be understood that both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention and together with the description serve to explain the principles of the invention.

DESCRIPTION OF THE DRAWINGS

This invention is further understood by reference to the drawings wherein.

DETAILED DESCRIPTION OF THE INVENTION

Figure 1:
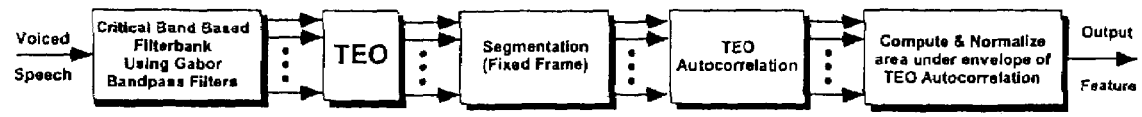
FIG. 1 shows a flow diagram of the feature extraction process.

The present invention is directed to the problem of detecting or measuring the presence or absence of at least one emotion in speech by analyzing nonlinear feature characteristics in specific frequency bands. In other words, the present invention provides methods and systems for detecting, measuring, or monitoring, the presence or absence of at least one emotion in a subject by analyzing at least one nonlinear feature characteristic in at least one specific frequency band in a speech sample obtained from the subject. Emotions that may be detected or measured according to the present invention include admiration, affection, agitation, anger, apprehension, betrayal, consternation, contempt, curiosity, deceitfulness, determination, desire, disappointment, disgust, dread, ecstasy, enthusiasm, embarrassment, fanaticism, fear, ferment, hate, hope, indignation, impatient, inspiration, joy, passion, perturbation, sadness, sincerity, shame, shock, sorrow, stress, sufferance, suspicion, sympathy, thrill, tolerance, regret, vehemence, zeal, and the like.

As described herein, the present invention provides a novel detection framework that uses weighted TEO-CB-AutoEnv features derived from critical band frequencies. The frequency dependent feature resulting from the TEO-CB-AutoEnv as described herein was not known or demonstrated prior to the present invention. The method of the present invention which comprises measuring the nonlinear energy content of a speech signal using the Teager Energy Operator, conducting auditory critical band analysis, and then conducting autocorrelation envelop analysis, shows a marked difference in the mid frequency bands between 800-1800 Hz, critical bands 4 to 8 in speech under stress as compared with a baseline or a control. A suitable baseline or control includes at least one speech sample taken from at least one subject lacking emotion, i.e. content or neutral. The subject from which the baseline or control speech sample is obtained may be the same or different subject from which the presence or absence of emotion detected, measured, or monitored.

The new weighted sub-band TEO-CB-AutoEnv feature detection method of the present invention exhibits detection error rates of about 4.7% for stress detection and about 4.6% for neutral detection. As explained herein, the use of a larger speech corpus, more variables, such as additional vowels, or both should decrease the detection error rates even more. Therefore, the present invention provides a method for detecting emotion, such as stress, in speech that exhibits a detection error rate of about 4.7% or less, preferably about 3.0% or less, more preferably about 2.0% or less, most preferably about 1.0% or less. Using the traditional TEO-CB-AutoEnv feature vectors with an HMM trained stressed speech classifier provides error rates of 22.5% and 13% for stress and neutral speech detection, respectively for the same test data configuration. Therefore, the present invention provides a relative error reduction of about 79.1% and about 64.6% for stress and neutral speech detection, respectively. Since it is expected that use of a larger speech corpus, more variables, or both, will decrease the detection error rates, the present invention provides a method for detecting, measuring, or monitoring, an emotion, such as stress, in speech that reduces the detection error rate by about 60.0% or more, preferably about 70.0% or more, more preferably about 80.0% or more, even more preferably about 90% or more, and most preferably 95.0% or more than the detection error rates of prior art methods.

The present invention also provides a human model for detecting, measuring, or monitoring emotion, such as stress, in speech. Specifically, as described in Example 1, speech samples were collected during a Soldier of the Quarter (SOQ) paradigm. Subjects subjected to the SOQ paradigm from which speech samples were collected, independently showed a statistically significant change in blood pressure, heart rate and blood chemical composition between neutral and stress conditions. Therefore, the present invention provides a human stress model for studying and developing methods and systems including algorithms for automated speech recognition, detecting and measuring emotion such as stress, anxiety, and anger, as well as deception in speech, diagnosis and treatment of speech pathologies, and diagnosis of medical conditions that cause observable or measurable changes in speech, such as neurological disorders including neurodegenerative diseases such as Parkinson's Disease, Huntington's Disease, Creutzfeld Jacob and the like, ALS, myasthenia, and dysarthrias, and intoxications such as those caused by chemical agents, drug overdose, and drug abuse. See e.g. Hansen, J. H. L, et al. (1998) IEEE Transactions on Biomedical Engineering, 45(3):300-313 (use of single filter band based TEO-AutoEnv feature to detect speech under vocal fold pathology, i.e. vocal fold cancer), which is herein incorporated by reference.

Historically, most approaches to speech modeling have taken a linear plane wave point of view. While features derived from such analysis can be effective for speech coding and recognition, they are clearly removed from physical speech modeling. Teager did extensive research on nonlinear speech modeling and pioneered the importance of analyzing speech signals from an energy point of view. See Teager, H. (1990) IEEE Trans. on Acoustics, Speech, and Signal Processing ASSP-28(5):599-601; and Teager, H. and S. Teager (1990) Speech Production and Speech Modeling, NATO Advanced Study Institute, vol. 55, Kluwer Academic Pub., pp. 241-261, which are herein incorporated by reference. Teager devised a simple nonlinear, energy tracking operator, for a continuous time signal x(t) as follows:

$$\Psi_c[x(t)] = \left(\frac{d}{dt}x(t)\right)^2 - x(t)\left(\frac{d^2}{dt^2}x(t)\right)$$
$$= [\dot{x}(t)]^2 - x(t)\ddot{x}(t),$$

and for a discrete-time signal χ(n) as:

$$\Psi[\chi(n)] = \chi^2(n) - \chi(n+1)\chi(n-1),$$

where Ψ[•] is the Teager Energy Operator(TEO).

These operators were first introduced systematically by Kaiser. See Kaiser, J. F. (1990) ICASSP-90. pp. 381-384; and Kaiser, J. F. (1990) Proc. 4th IEEE Digital Signal Processing Workshop, which are herein incorporated by reference. Having established the discrete time TEO, a later study produced an AM-FM parameterization (referred to as DESA-1 and DESA-2). See Maragos, P., et al. (1993) IEEE Trans. on Signal Proc. 41(10):3025-3051, which is herein incorporated by reference.

Under stressful conditions, a variety of speech production characteristics will be affected which include fundamental frequency (pitch) structure, duration, intensity, glottal spectral slope, vocal track formant structure. See Hansen, "Analysis and Compensation of Stressed and Noisy Speech with Application to Robust Automatic Recognition," PhD. Thesis, Georgia Inst. of Technology, School of ECE, July 1988, which is herein incorporated by reference. One of the speech signal's characteristics that change is the fundamental frequency ($f_o$) and hence the distribution pattern of pitch harmonics across critical bands is different for speech under neutral and stress conditions. It is noted that the change in the number of harmonics present in each critical band will cause a significant change in the number and structure of cross terms produced during TEO based operation. It is therefore the presence and structure of these cross terms that produces a significant change in the response seen in the TEO processing. Therefore, for finer resolution of frequencies, the entire audible frequency range can be partitioned into many critical bands. See Scharf, B. (1970) Foundations of Modern Auditory Theory, ed. J. V. Tobias, Academic Press, vol. 1, pp. 157-202; and Yost, W. A. (1994) FUNDAMENTALS OF HEARING, 3rd ed., Academic Press, pp. 153-167, which are herein incorporated by reference. Each critical band possesses a narrow bandwidth, i.e., typically 100-400 Hz, thereby making the TEO-CB-AutoEnv feature independent of the accuracy of median F. estimation. This is an important advantage of the stress detection method of the present invention, since earlier based TEO processing schemes required a fundamental frequency (pitch) tracking scheme to determine the pitch harmonic closest to the center frequency of the first formant. See Cairns, D. and J. H. L. Hansen, (1994) Journal of the Acoustical Society of America 96(6):3392-3400; Zhou, G., et al. (2001) IEEE Transactions on Speech & Audio Processing 9(2):201-216; which are herein incorporated by reference.

The feature extraction procedure may be mathematically summarized using bandpass filters (BPF) centered at critical band frequency locations as follows:

$$u_j(n) = s(n) * g_j(n),$$

$$\Psi_j(n) = \Psi[u_j(n)] = u_j^2(n) - u_j(n-1)u_j(n+1),$$

$$R_{\Psi_j^{(i)}(n)}(k) = \sum_{n=1}^{N-k} \Psi_j^{(i)}(n)\Psi_j^{(i)}(n+k),$$

where, $g_j(n)$, j=1, 2, 3, . . . 16, is the BPF impulse response,
$u_j(n)$, j=1, 2, 3, . . . 16, is the output of each BPF,
"*" is the convolution operator
$R_{\Psi_j^{(i)}(n)}(k)$ is the autocorrelation function of the ith frame of the TEO profile from the jth critical band, $\Psi_j^{(i)}(n)$, and, N is the frame length.

FIG. 1 shows a flow diagram of the feature extraction process. The TEO-CB-AutoEnv feature has been shown to reflect variations in excitation characteristics including pitch harmonics, due to its finer frequency resolution. However, as described herein, the variation in excitation structure is not uniform across all the bands. Moreover, as shown herein, certain frequency bands are more sensitive to stress in speech and other frequency bands are more sensitive to neutral speech. The sensitivity of the frequency bands is speaker independent. Therefore, the present invention provides methods for detecting stress in speech with a general reference model and without the need of a speaker dependent neutral or stress model.

The present invention provides a method for detecting and measuring stress in speech which is based on the experiments described in Examples. Generally, the method comprises analyzing a feature with a weighted frequency band scoring scheme in which each frequency band is weighted, depending upon its sensitivity to stress or neutral speech, with the condition that all weights sum to unity. The weights used in the formulation are determined experimentally and the same set of weights is used for stress or neutral speech classification. The equation below shows how an overall model score is obtained using stress and neutral sensitive bands:

$$\text{Score} = \sum_{n=1}^{4} W_{(n)} SNB_{(j)} - \sum_{n=1}^{4} W_{(n)} SSB_{(j)}$$

where, $SNB_{(j)}$=Sensitive Neutral Bands: j=5, 8, 9, 13
$SSB_{(j)}$=Sensitive Stress Bands: j=7, 12, 14, 16
$W_{(n)}$=band 'n' Weight.

As provided in Example 2, using the entire TEO-CB-AutoEnv frequency range for the feature, i.e. a vector of TEO-CB-AutoEnv area coefficients, baseline stress and neutral error rates are 22.5% and 13%. As provided in Example 5, the results from the experiments in Examples 3 and 4 were used to establish stress and neutral sensitive bands. The stress and neutral sensitive bands were used to establish the new weighted algorithm provided above. The weighted algorithm provides error rates of about 4.7% and about 4.6% for stress and neutral detection, respectively. This corresponds to relative 79.1% reduction in the stress speech detection error rate, and a 64.6% relative reduction in the neutral speech detection error rate. Thus, the resulting weighted TEO-CB-AutoEnv detection scheme of the present invention provides a substantial improvement in stress and neutral speech detection over prior art methods.

A test using the corpus described herein was conducted and the neutral detection rates were found to vary between about 77.7% to about 97.2%. It is believed that the variability in neutral based recognition is due to the variability in subjects' vocal tract shape, i.e. length and area during production of the same phonemes, as well as the normal intra-speaker variability when one subject speaks. The variability in the detection rates may be decreased by collecting speech samples from a greater number of subjects, considering more vowels or consonants in each speech sample, collecting more samples from the same subject, ore a combination thereof.

The present invention provides a fully automated computerized system that accounts for stress while evaluating speech and voice information. The system may be used (1) as an adjunct to diagnosis and patient management in military and civilian medicine; (2) for detection of deception and emotions; and (3) to eliminate the contribution of stress to error rate in automatic speech recognition (ASR) systems by continuously adapting to changes in a speaker's emotional state.

The present invention also provides methods and systems for identifying or analyzing the effects of emotion in speech such as task stress in aircraft pilot communications, emergency stress in 911 calls, or stress associated with psychological pressure in given situations such as legal depositions as well as other communications such as during combat, police emergencies, medical emergencies, psychiatric differential diagnosis, hostage negotiations, security screening, voice activated computer operations. The present invention also provides methods and systems for identifying or analyzing the affects of external influences such as physical assault, physical exertion, loud noises, and the like on speech.

Additionally, the present invention provides methods and systems for identifying an analyzing emotion in speech such as determining whether one type of emotion such as anger has an effect on speech that is different from the effects of another emotion such as anxiety by comparing the speech samples from subjects experiencing the first emotion, the second emotion, and neither emotion and then determining which bands are sensitive to each emotion and assigning the speech sample a score based on a weighted sub-band scoring scheme similar to the methods described herein.

The present invention further provides methods and systems that monitor artifacts such as in a subject's voice patterns and rapidly identify and quickly adjust to the artifacts in a non-invasive, unobtrusive and reliable manner which will allow one to better determine if a subject is in a stressful or dangerous field setting such as combat. The methods and systems that monitor such stress based artifacts may be used to provide valuable information with which to adapt speech recognition technology including algorithms, software, and hardware. Previous studies have shown that stress based knowledge can significantly improve automatic speech recognition performance in small-vocabulary tasks in noisy-stressful conditions. See Hansen, J. H. Ll. (1996) Speech Communications, Special Issue on Speech under Stress 20(2):151-170, which is herein incorporated by reference. Therefore, the present invention provides a method and system that improves the performance of automatic speech recognition methods and systems by monitoring and adjusting to artifacts and emotions.

Previously available speech recognition methods and systems were developed for use in the commercial sector and were therefore not designed to perform in harsh military or civilian emergency scenarios as the linear predictive models using parameters such as Mel-frequency cepstral coefficients assume that the speaker is in a quite tranquil environment. Since the methods and systems of the present invention can detect, measure, monitor, or a combination thereof in speech, the methods and systems of the present invention may be utilized in military and other emergency or highly stressful settings.

For example, the methods and systems of the present invention may be used in automatic speech recognition (ASR) "command post of the future" systems in the military without having the effects of emotion such as stress during emotionally charged situations such as combat increase the error rates. The methods and systems of the present invention may be seamlessly integrated with methods and systems that monitor subjects for psychological wellness, fitness of duty, readiness, alertness, or a combination thereof. The methods and systems of the present invention may be used for identifying operatives who have become compromised as well as identifying the situations in which the operatives have become compromised.

In civilian emergency settings, the methods and systems of the present invention may be used in emergency management systems that employ automated speech recognition technology. For example, 911 emergency calls may be routed through ASR systems that detect, monitor, or measure the amount of stress of the person making the 911 telephone call.

The methods and systems of the present invention may be used in medical applications, wherein differential diagnosis, disposition decisions, or both must be made from a remote location such as the case with many military medical operations and telemedicine. For example, the methods and systems of the present invention may be used to detect, diagnose, or treat (1) psychiatric conditions such as incipient combat stress reaction, acute stress reaction, anxiety disorder, panic disorder, adjustment disorder, posttraumatic stress disorder, agitated depression, psychoses, threatened or potential suicide; and (2) medical conditions that cause observable or measurable changes in speech, such as neurological disorders including neurodegenerative diseases such as Parkinson's Disease, Huntington's Disease, Creutzfeld Jacob and the like, ALS, myasthenia, and dysarthrias, and intoxications such as those caused by chemical agents, drug overdose, and drug abuse. For example, the methods and systems of the present invention can be used for surveillance for botulinum toxicity, mercury poisoning, manganese poisoning, insecticide poisoning, nerve agent intoxication, and the like.

The methods and systems of the present invention may further include analyzing the rate of speech and semantic content, as well as non-linguistic aspects such as amplitude, shimmer, $F_o$ floor, $F_o$ median, $F_o$ range, rate of $F_o$ modulation, jitter, formant location, dynamics of formant frequencies, non-linearities, and features of articulation. The methods and systems of the present invention may also include analyzing linear parameters such as pitch, pitch rate, glottal spectral slope, formant location, glottal pulse shape, duration of voiced speech such as dipthongs, nasals, and semivowels. For example, under normal conditions vowel duration is about 50% of each phoneme, whereas under laboratory simulated stressful conditions the vowel duration increases to about 65%. Under normal conditions consonant duration is about 18% of total phoneme duration, however, under laboratory simulated stressful conditions consonant duration decreases to about 10%. The methods and systems of the present invention may further include utilizing dyadic wavelet pitch detector, first formant tracking, nonlinear features derived from the Teager energy profile, and hidden Markov modeling.

The methods and systems of the present invention may be used in voice-based identity authentication methods and systems to prevent access to data or a place by person who forces a subject having access to request access. Specifically, if a person forces the subject having access to request access, the methods and systems of the present invention may be used to detect or monitor stress in the speech of the subject. In the event that stress or higher than normal amounts of stress are detected, access to the data or the place may be denied or require passing further security measures.

The propulsive force of contraction of the left ventricle of the heart is significant as the impulse of the heartbeat can be detected indirectly from subjects suspended in water or in air and the heartbeat of some musicians who play a wind instrument can be heard in the sound of the wind instrument if the musician does not take beta-adrenergic blocking drugs before the performance. Therefore, the methods and models of the present invention may be used to analyze specific frequencies and periodicities that may be used to detect heart rate in the voice spectra without precordial electrodes, or any form of direct physical contact.

The following examples are intended to illustrate but not to limit the invention.

EXAMPLE 1

Soldier of the Quarter (SOQ) Speech Corpus

A speech under stress corpus was collected at the Walter Reed Army Institute of Research (WRAIR). The speech corpus was constructed using the WRAIR Soldier of the Quarter (SOQ) Board paradigm, by recording the spoken response of individual soldiers to questions in a neutral setting, as well as while seated in front of a military evaluation board, wherein all board members had military rank much above the soldier who faced the panel). See Meyerhoff, J. L., et al. (1987) The Hypothalamic-Pituitary-Adrenal Axis Revisited: Annals of the New York Academy of Sciences, ed. by W. F. Ganong, M. F. Dallman and J. L. Roberts, 512:494-495; Meyerhoff, J. L., et al. (1988) Psychosomatic Medicine 50(3):295-303; and Oleshansky, M. A. and Meyerhoff, J. L. (1992) Stress Medicine 8:175-179, which are herein incorporated by reference.

The SOQ paradigm is a robust, repeatable, ethical and well-characterized stress model, and coupled quantitative performance indices and validated measures of stress (psychometrics, heart rate, blood pressure and stress hormones). See Meyerhoff, J. L., et al. (1988) Psychosomatic Medicine 50(3):295-303; Meyerhoff, J. L., et al. (1988) Mechanisms of Physical and Emotional Stress: Advances in Experimental Biology and Medicine, ed. by G. P. Chrousos, D. L. Loriaux and P. W. Gold, Plenum Press. 245:465-478; Meyerhoff, J. L., (1990) Circulating Regulatory Factors and Neuroendocrine Function: Advances in Experimental Biology and Medicine, ed. by J. C. Porter & D. Jezova, Plenum Press, 274:91-111; Oleshansky, M. A. and Meyerhoff, J. L. (1992) Stress Medicine 8:175-179; Meyerhoff, J. L., et al. (2000) MILITARY NEUROSCIENCE, ed. by K. Friedl, Louisiana University Press; and Glass, C. R., et al. (1995) Journal of Counseling Psychology 42(1):47-54, which are herein incorporated by reference.

The SOQ board is a training exercise and a competition used to prepare soldiers for actual promotion boards. Subjects in this study were candidates in the competition who volunteered to be studied after giving informed consent. The SOQ board involves a 20 minute interview of a soldier by a panel of five higher-ranking senior enlisted who question the soldier about his/her knowledge of military operating procedures, rules, customs and skills. A militarily appropriate phrase of 9 syllables, "the answer to this question is no", was seamlessly embedded into the interview and is also spoken by the subjects under baseline conditions before and after the interview. The stressfulness of the model is illustrated powerfully, in the first 5 minutes of the interview when the average blood pressure of subjects increased to about 170/100. In this model, robust increases are also seen in heart rate, as well as plasma levels of the following stress-responsive hormones: ACTH, cortisol, vasopressin, adrenalin, noradrenaline and plasma renin activity. The subjects represent diverse ethnic groups, regional accents and females as well as males. Table 1 summarizes average speaker conditions for 6 speakers and 7 speech data collection phases, before (pre-stress) (A, B, C), during (stress) (D), and after (post-stress) (E, F, G) the Board.

TABLE 1

Summary of Mean Biometrics for SOQ Subjects

| Measure | A B<br>−7 Day | C<br>−20 min | D<br>Board | E<br>+20 min | F G<br>+7 Day |
|---------|---------------|--------------|------------|--------------|----------------|
| HR      | 70.3          | 70.8         | 93.2       | 69.5         | 67.2           |
| sBP     | 118.0         | 146.0        | 178.0      | 154.0        | 117.0          |
| dBP     | 77.5          | 74.8         | 89.7       | 71.2         | 69.5           |
| $f_0$   | 103.4         | 102.7        | 136.9      | 104.3        | 103.1          |

HR - Heartrate in beats per minute
sBP - Systolic blood pressure in mm
dBP - Dystolic blood pressure in mm
$f_0$ - Fundamental frequency in Hz Changes in mean heart rate (HR), blood pressure (sBP and dSP) and pitch ($f_o$) all confirm a change in speaker state between A, B, C, E, F, G and D. Results confirm a significant shift in biometric measures from the assumed neutral conditions, A, B, C, E, F, and G, versus the assumed stress condition, D. Each soldier was asked to answer all questions by responding, "The answer to this question is NO". Each speaker was asked the same set of 6 different militarily-relevant questions on seven occasions. The vowel 'o' extracted from the word "No" was evaluated. However, other vowels and consonants as well as other phrases and words may be evaluated according to the present invention.

Although the SOQ paradigm is designed to isolate the effect of a purely psychological stressor, other controlled stress paradigms including other factors such as Lombard effects, multi-frequency ambient noise, psychological stress, physical stress, or combinations thereof may be constructed and used. For example, a speech corpus from subjects performing psychologically stressful tasks in a multi-speaker, high ambient noise, multi-scenario environment which includes performing manual tasks such as operating rapidly moving vehicles may be used. Specifically, a model such as an exercise assessing survival skills in individuals in training for police duties may be used. The test paradigm may involve driving in a high speed chase, while maintaining constant radio communications with superiors, use of deadly force in a hostage situation and facing interrogation by a superior officer regarding their decisions and performance, and simulated pistol fire (e.g. with 9 mm paint munitions) between subjects and role players and the location of "hits" scored for lethality/non-lethality. Ambient noise may include sirens, large barking dogs, 9 mm munitions and shotgun blasts, as well as constant radio traffic and required responses. See also e.g. Hansen, J. H. L., et al. (2000) NATO Research & Technology Organization RTO-TR-10, AC/323(IST)TP/5 IST/TG-01, which is herein incorporated by reference.

The general procedure for performing stress/neutral speech recognition is as follows:

(i) Available training data in both neutral and stressed speech conditions are first parameterized by conventional methods known in the art;

(ii) The TEO-CB-AutoEnv feature is extracted on a frame-by-frame basis over voiced speech sections (most notably—sustained vowel sections) using conventional methods known in the art;

(iii) The TEO-CB-AutoEnv feature is obtained by using a frame of speech data, filtering it across a critical-band frequency partition (the number of filters will depend on the sample rate and available speech frequency band), applying the Teager Energy Operator (TEO) at the output of each filter band, each processed block is then analyzed to find the autocorrelation response over a 0 to 25 msec lag range, after obtaining the autocorrelation response over 0-25 msec the area under this envelope is determined for each frequency band (areas should be large for neutral speech indicating a high degree of regularity, and areas should be small for stressed speech indicating higher degree of irregularity in the assumed energy of the nonlinear airflow above the vocal folds as represented by the TEO operator);

(iv) Once the TEO-CB-AutoEnv area coefficient is obtained from each filterband on a frame-by-frame basis, the available data is submitted to a hidden Markov model (HMM) based training scheme using traditional forward-backward Baum-Welch re-estimation (as described herein 5-state HMMs with 2 mixtures were used, but it is noted that the number of mixtures could be adjusted based on the number of speakers being modeled in the stress/neutral classifier models); and (v) Once these models have been determined, the system is ready for use in stress/neutral speech classification, i.e. a test speech sample is submitted to the system, the same vowel sections are identified and TEO-CB-AutoEnv features are extracted on a frame-by-frame basis, after which the feature stream is submitted to the neutral trained HMM model and stressed speech trained HMM model; standard Viterbi decoding is used within the HMM recognition phase and the model which produces the highest log probability is selected as the stress/neutral style contained in the speech signal.

EXAMPLE 2

HMM Baseline Classification System

A baseline Hidden Markov Model (HMM) system was formed using the SOQ corpora of Example 1. Acoustic models comprised three state HMM's each with two Gaussian mixtures. A total of 191 tokens were used for training the neutral model, while 30 tokens were used for training the stress model in a traditional round robin manner. The front-end feature consists of a sixteen dimensional TEO-CB-AutoEnv vector. The speech data obtained during the SOQ Board scenario was assumed to be "Stress" and the remaining speech data was grouped together as "Neutral" based upon biometric results. Thus, two HMM models termed "Neutral" and "Stress" result after the training phase. Using the entire critical band TEO-CB-AutoEnv feature, a round-robin open error classification rate was found to be 22.5% for stress and 13% for neutral.

These studies have shown that the range of area coefficient values does vary depending on the type of stress. Neutral speech always produces larger TEO-CB-AutoEnv values, and stressed speech always produces smaller values. However, some stressed speech conditions, i.e., SOQ data which might be considered a milder level of stress, produced different absolute area ranges versus speech under more extreme stress conditions, i.e. speech from rollercoaster rides in SUSAS-speech under simulated and actual stress corpus. Therefore, the methods and systems of the present invention may be used to classify different types or degrees of stress and other emotions.

EXAMPLE 3

HMM for Frequency Band Analysis

For frequency band analysis, a second HMM classification system was trained with a front-end feature made up of the TEO-CB-AutoEnv of each individual band, forming an independent system. A separate Neutral and Stress model, was therefore constructed for every band. In addition to single band neutral and stress models, models using the first four bands (1-4), bands 5-8, and the last four bands (12-16) grouped together were trained, thereby providing thirty-two single band models, sixteen of which are neutral and sixteen under stress. An additional six four-band models were trained and classified in a similar manner.

Available speech data was partitioned into training, development-test, and test data. After an initial training phase, the development test data was used to determine which frequency bands were most sensitive to neutral and which were most sensitive to stress. In the evaluations performed, the same filter bands were selected for the six subjects tested with excellent neutral/stress classification performance.

It is noted that the most sensitive bands may have some degree of speaker dependency, and therefore in preferred embodiments of the present invention, a development-test set is used to determine which bands are most sensitive to neutral and stressed speaking conditions. It is also possible that the selection of the particular bands may have some dependency on the type of stress, so bands sensitive to SOQ type stress, may not be the most successful bands for another class of speech under stress, i.e., emotional fear, physical stress in fighter cockpit environments, and the like. Therefore, in preferred embodiments of the present invention, a development-test set is used to determine which bands are most sensitive to a given type or degree of stress or other emotion. After using the development-test data to determine the proper band selection, open testing can be performed using the last test data set to determine performance for that neutral/stress style of speech and speaker group.

EXAMPLE 4

TEO Autocorrelation Envelope Analysis

Figure 2:
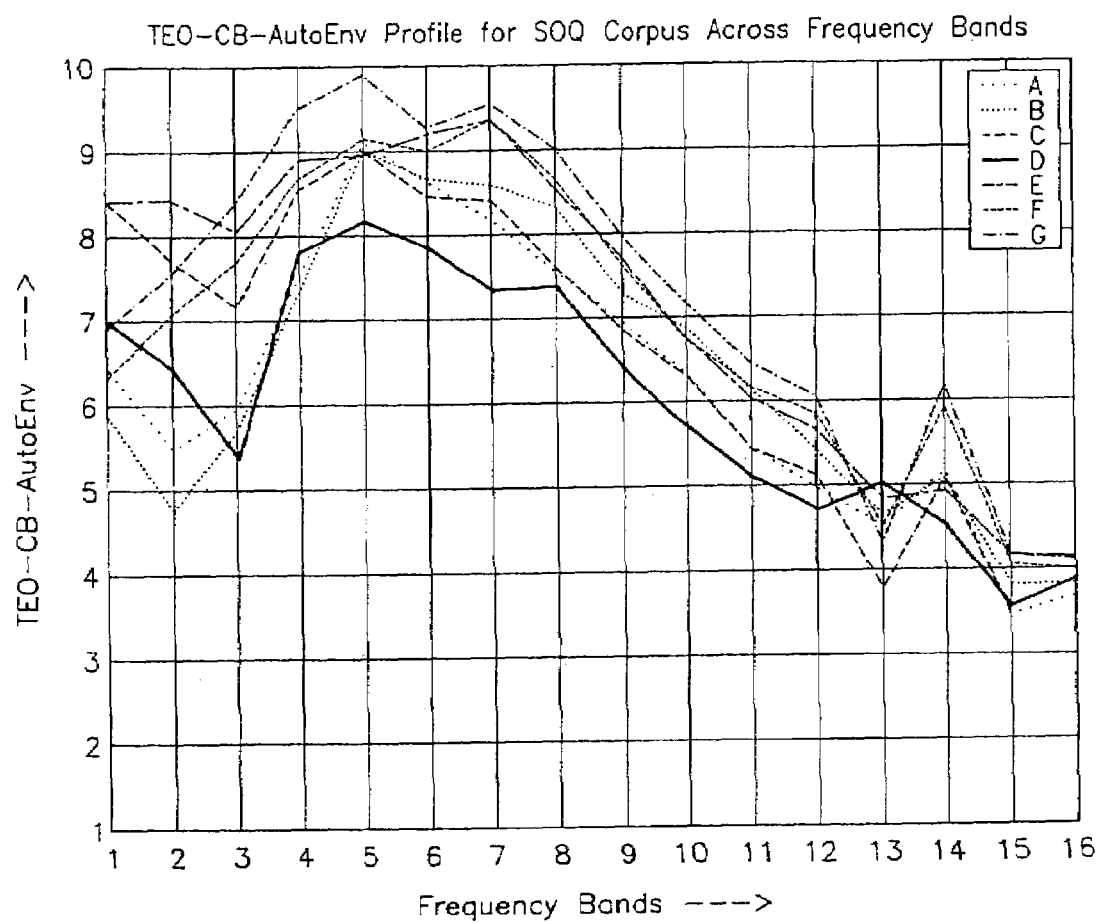
FIG. 2 shows average feature profile before the board (A, B, C), during the board (D), and after the board (E, F, G).

In this initial experiment, the area under the TEO auto-correlation envelope across sixteen frequency bands was studied. The area under the auto-correlation envelope was calculated across all speakers and averaged for all sixteen bands. FIG. 2 shows average feature profile before the board (A, B, C) and after the board (E, F, G). The continuous line represents the stress scenario (D). The TEO autocorrelation envelope analysis was performed according to the procedure outlined in Example 1 for obtaining the frame-by-frame based TEO-CB-AutoEnv feature.

Figure 3:
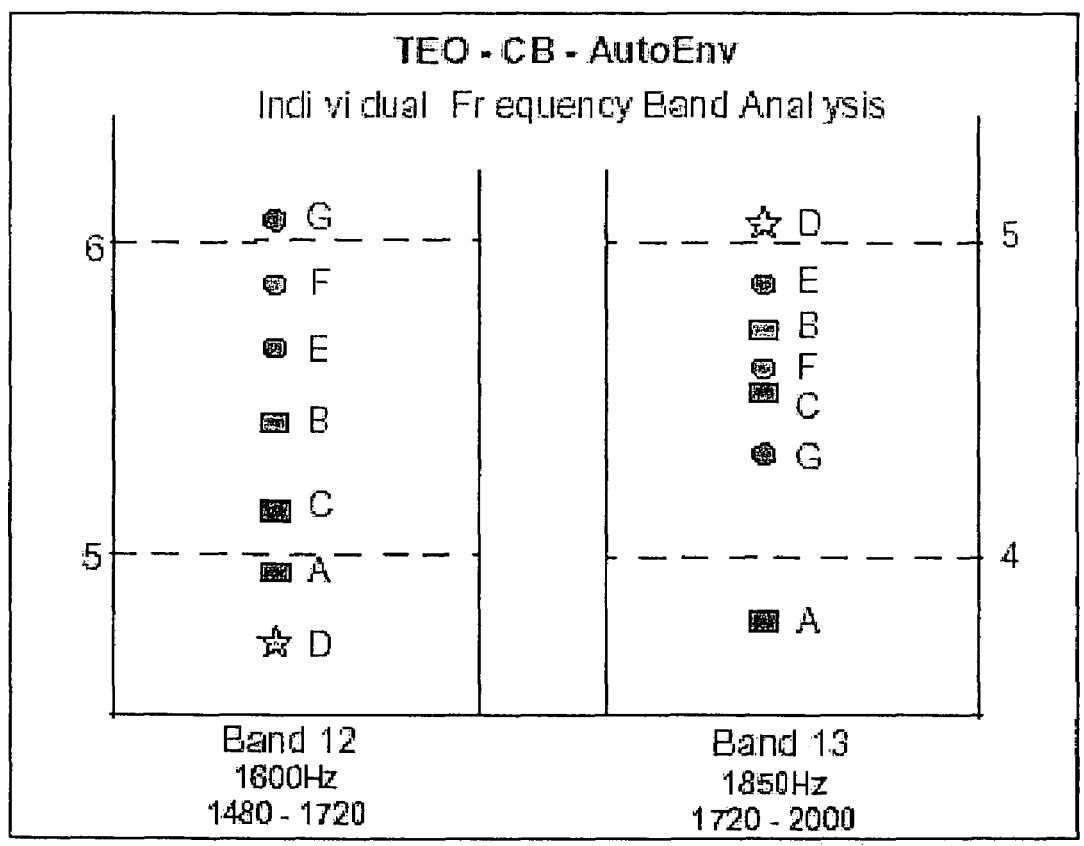
FIG. 3 shows the average feature profile before the board (A, B, C), during the board (D), and after the board (E, F, G) for frequency bands 12 and 13.

As provided in FIG. 2, the area under the autocorrelation envelope for some bands is more distinct for some neutral and stress models. The TEO-CB-AutoEnv is lower in magnitude for low and mid-band frequencies (i.e., bands 3, 5-7) for stress versus neutral. Analysis of bands 12 and 13, shown in detail in FIG. 3, demonstrate the significant shift in area feature responses under neutral and stressed speech conditions. For band 12, the stress condition D produced the lowest score, while for band 13 it was largest. These results strongly suggest a frequency dependent nature of TEO-CB-AutoEnv feature.

EXAMPLE 5

Band Classification Sensitivity Towards Neutral & Stress Speech

Figure 4:
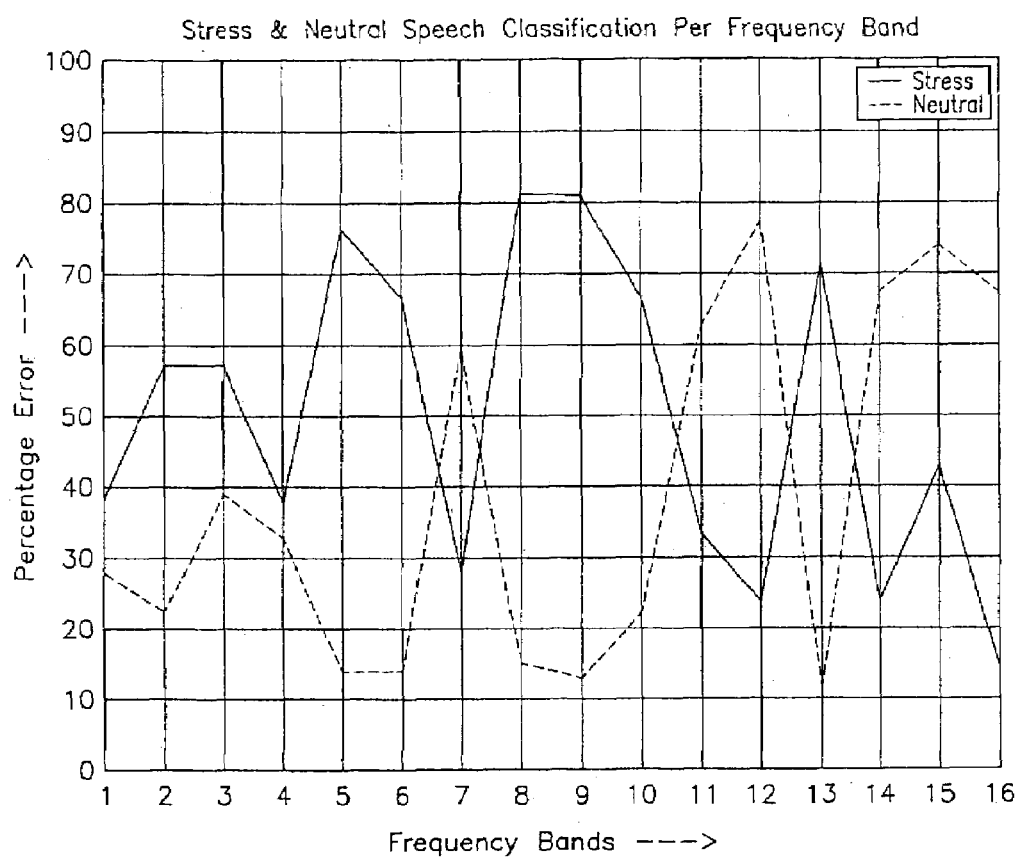
FIG. 4 shows the results for both stressed and neutral speech classification.
Figures 5A, 5B:
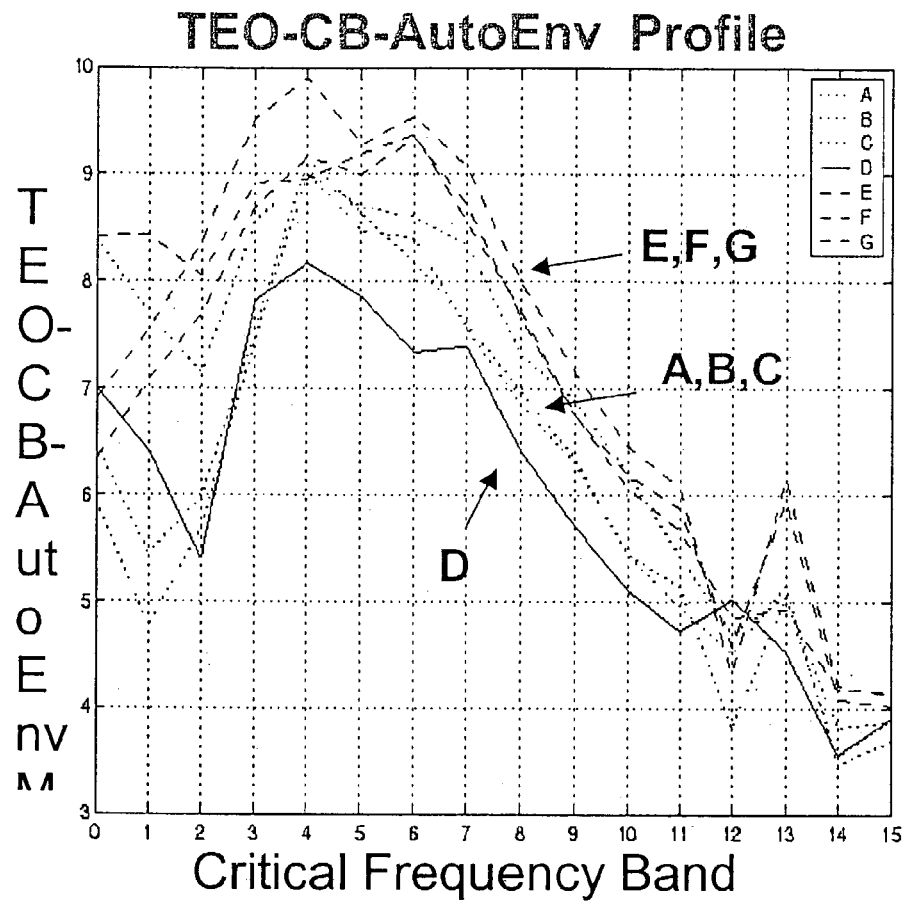
FIG. 5A shows the TEO-CB-AutoEnv profile.
FIG. 5B shows the test time, feature mean and change in HMM score.

The results of Examples 3 and 4 suggest a frequency sensitive nature for the TEO-CB-AutoEnv feature. Therefore, in order to determine whether some bands are consistently more reliable in detecting neutral or stressed speech, stress classification within each band was performed. FIG. 4 shows the results for both stressed and neutral speech classification. FIGS. 5A and 5B show the test times, feature mean, and change in HMM score. Bands 5, 8, 9 and 13 are sensitive to neutral speech (i.e., above 85% correct neutral classification), while bands 7, 12, 14 and 16 are sensitive to speech under stress (i.e., above 70% correct stress classification). Individual error rates for stress and neutral speech recognition are sumnmarized in Table 2.

TABLE 2

Percentage Error Rate in Stress/Neutral Recognition

| Band | Stress | Neutral |
|---|---|---|
| 1 | 38.09 | 28.04 |
| 2 | 57.14 | 22.35 |
| 3 | 57.14 | 38.99 |
| 4 | 38.09 | 32.91 |
| 5 | 76.19 | 13.97 |
| 6 | 66.67 | 13.97 |
| 7 | 28.57 | 58.94 |
| 8 | 80.95 | 14.92 |
| 9 | 80.95 | 13.07 |
| 10 | 66.67 | 22.46 |
| 11 | 33.33 | 62.46 |
| 12 | 23.81 | 77.54 |
| 13 | 71.43 | 11.21 |
| 14 | 23.81 | 67.22 |
| 15 | 42.86 | 73.84 |
| 16 | 14.29 | 67.25 |
| 1, 2, 3, 4 | 42.86 | 15.87 |
| 5, 6, 7, 8 | 47.62 | 24.15 |
| 13, 14, 15, 16 | 57.14 | 8.37 |

Results are also shown for combined 1-4, 5-8, and 13-16 band-sets. Clearly, some combinations significantly outperform individual frequency bands for stress speech classification. Moreover, bands which are sensitive to stress are complementary to those sensitive to neutral. Again, all stress classification rates are based on single phonemes tests using 'o' in word "no". However, other vowels and consonants as well as other phrases and words may be evaluated according to the present invention.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

We claim:

1. A method for detecting, measuring, or monitoring the presence or absence of at least one emotion in a subject from a speech sample obtained from the subject which comprises extracting at least one Teager Energy Operator critical band based autocorrelation envelope (TEO-CB-AutoEnv) feature from the speech sample, assigning the speech sample a score using a weighted frequency band scoring scheme, and determining whether the score is indicative of the presence or absence of the at least one emotion by comparing the score with a general reference model or a control.

2. The method of claim 1, wherein the emotion is admiration, affection, agitation, anger, apprehension, betrayal, consternation, contempt, curiosity, deceitfulness, determination, desire, disappointment, disgust, dread, ecstasy, enthusiasm, embarrassment, fanaticism, fear, ferment, hate, hope, indignation, impatient, inspiration, joy, passion, perturbation, sadness, sincerity, shame, shock, sorrow, stress, sufferance, suspicion, sympathy, thrill, tolerance, regret, vehemence, or zeal.

3. The method of claim 1, wherein the emotion is stress.

4. The method of claim 1, wherein the emotion is induced by an external influence.

5. The method of claim 1, wherein the speech sample is "o" in the word "no".

6. The method of claim 5, wherein the word "no" is in the phrase "the answer to the question is no".

7. The method of claim 1, wherein the TEO-CB-AutoEnv feature is at least one critical band frequency band.

8. The method of claim 7, wherein the critical frequency band is a narrow bandwidth of about 100 Hz to about 400 Hz.

9. The method of claim 7, wherein the critical frequency bands are defined by partitioning the audible frequency range of the speech sample into fifteen equal bandwidths.

10. The method of claim 7, wherein the critical frequency band is frequency band 5, 8, 9, or 13.

11. The method of claim 7, wherein the critical frequency band is frequency band 7, 12, 14, or 16.

12. The method of claim 1, wherein the TEO-CB-AutoEnv feature is sensitive to neutral speech.

13. The method of claim 10, wherein the frequency band is sensitive to neutral speech.

14. The method of claim 1, wherein the TEO-CB-AutoEnv feature is sensitive to stress in speech.

15. The method of claim 1, wherein the frequency band is sensitive to stress in speech.

16. The method of claim 1, wherein assigning the speech sample the score using the weighted frequency band scoring scheme comprises assigning the TEO-CB-AutoEnv feature a weight based on whether the TEO-CB-AutoEnv feature is sensitive to neutral speech or emotion in speech, wherein all weights sum to unity.

17. The method of claim 16, wherein at least one TEO-CB-AutoEnv feature sensitive to emotion in speech are extracted and the score is the sum of the weighted features sensitive to neutral speech minus the sum of the weighted features sensitive to emotion in speech.

18. The method of claim 17, wherein a positive score indicates the absence of the emotion.

19. The method of claim 17, wherein a negative score indicates the presence of emotion.

20. The method of claim 1, wherein a plurality of TEO-CB-AutoEnv features are extracted from the speech sample.

21. The method of claim 20, wherein the plurality of TEO-CB-AutoEnv features are extracted from a plurality of vowels in the speech sample.

22. The method of claim 20, wherein the plurality of TEO-CB-AutoEnv features are extracted from a plurality of consonants in the speech sample.

23. The method of claim 1, wherein the method provides a detection error rate of about 4.7% or less.

24. The method of claim 23, wherein the method provides a detection error rate of about 3.0% or less.

25. The method of claim 24, wherein the method provides a detection error rate of about 2.0% or less.

26. The method of claim 25, wherein the method provides a detection error rate of about 1.0% or less.

27. The method of claim 1, wherein the method provides a reduction in the detection error rate by about 60.0% or more than the detection error rates of prior art methods.

28. The method of claim 27, wherein the method provides a reduction in the detection error rate by about 70.0% or more than the detection error rates of prior art methods.

29. The method of claim 28, wherein the method provides a reduction in the detection error rate by about 80.0% or more than the detection error rates of prior art methods.

30. The method of claim 29, wherein the method provides a reduction in the detection error rate by about 90% or more than the detection error rates of prior art methods.

31. The method of claim 30, wherein the method provides a reduction in the detection error rate by about 95.0% or more than the detection error rates of prior art methods.

32. A method for detecting, measuring, or monitoring the presence or absence of an emotion in a subject from a speech sample obtained from the subject which comprises parameterizing training speech from at least one speaker obtained while the speaker was experiencing the emotion and while the speaker was lacking emotion;

extracting a Teager Energy Operator critical band based autocorrelation envelope (TEO-CB-AutoEnv) feature on a frame-by-frame basis over at least one voiced speech section;

obtaining a TEO-CB-AutoEnv area coefficient from at least one filter band on a frame-by-frame basis;

submitting the TEO-CB-AutoEnv area coefficient data to at least one hidden Markov model (HMM) based training scheme using traditional forward-backward Baum-Welch reestimation;

classifying each band as sensitive to the presence of emotion or sensitive to the absence of the emotion;

assigning the speech sample a score using a weighted frequency band scoring scheme and;

determining whether the score is indicative of the presence or absence of the at least one emotion.

33. The method of claim 23, wherein the TEO-CB-AutoEnv area coefficient data is obtained by using a frame of speech data, filtering the frame of speech data across at least one critical-band frequency partition;

applying the Teager Energy Operator (TEO) at the output of the filter band;

analyzing each processed block to obtain an autocorrelation envelope over about 0 to about 25 msec lag range, and determining the area under the autocorrelation envelope for the band.

34. The method of claim 33, wherein a large area under the autocorrelation envelope indicates the absence of the emotion and a small area under the autocorrelation envelope indicates the presence of emotion.

35. The method of claim 33, wherein the speaker is not the same as the subject.

36. The method of claim 33, wherein the speaker is different from the subject.

37. The method of claim 33, wherein the training speech data is obtained from a plurality of speakers.

38. A system for detecting, measuring, or monitoring the presence or absence of an emotion in a subject from a speech sample obtained from the subject which comprises
- a feature extractor that extracts at least one Teager Energy Operator critical band based autocorrelation envelope (TEO-CB-AutoEnv) feature from the speech sample,
- a scorer that assigns the speech sample a score using a weighted frequency band scoring scheme, and
- a determinator that determines the presence or absence of the emotion based on the score.

39. A computer program embodied on a computer readable medium for analyzing the presence or absence of an emotion in a subject from a speech sample obtained from the subject which comprises
- a code segment that extracts at least one Teager Energy Operator critical band based autocorrelation envelope (TEO-CB-AutoEnv) feature from the speech sample,
- a code segment that assigns the speech sample a score using a weighted frequency band scoring scheme, and
- a code segment that determines the presence of absence of the emotion based on the score.

* * * * *